Patented Sept. 29, 1942

2,297,441

UNITED STATES PATENT OFFICE 2,297,441

METHOD OF PRESERVING FISH AND SIMILAR FOOD PRODUCTS OF ANIMAL ORIGIN

Rudolf Thilenius, Frankfort-on-the-Main, Germany; vested in the Alien Property Custodian No Drawing. Application November 17, 1939, Serial No. 305,014. In Germany November 24, 1938

5 Claims. (Cl. 99—195)

This invention relates to a process for the preservation of fish, meat, or other perishable foodstuffs, especially those of animal origin. More particularly, it relates to a process for the preservation of food products of animal origin by the preservative action of hydrogen peroxide, and especially by the combined action of hydrogen peroxide and ice.

It is one of the objects of this invention to develop a process for the preservation of fish, meats, and other foodstuffs of animal origin which will insure the preservation of those foodstuffs such as fish, for example, for relatively long periods of time. It is another object of this invention to develop an improved process for the preservation of foodstuffs of animal origin by the action of hydrogen peroxide wherein those food products will be preserved for a period of time considerably longer than that period during which the preserving agent hydrogen peroxide has previously been considered to exert an effective germicidal action. Still another object of this invention is to develop an improved method for the preservation of foodstuffs of animal origin wherein the foodstuff can be subjected to the improved preservation treatment and then packed in ice containing hydrogen peroxide, in accordance with methods now known to the art as described in my patent 2,150,616, issued March 14, 1939. These and still further objects of this invention will be more clearly apparent from the ensuing disclosure.

The use of ice containing hydrogen peroxide for the preservation of foodstuffs, particularly foodstuffs of animal origin, is already known to specialists in food preservation. Ice containing hydrogen peroxide has been found especially valuable for the storage of fish. Unfortunately, due to the inability in the past to prepare ice with a sufficiently high concentration of hydrogen peroxide, the foodstuffs of animal origin have not, in general, been preserved for the period of time of longest duration which would be desired by those engaged in the fish preserving industry. While my issued patent discloses a process for preparing ice containing hydrogen peroxide wherein the ice is rendered more effective, partly by reason of a higher hydrogen peroxide concentration, nevertheless it is frequently desirable to preserve foodstuffs of animal origin, such as fish, for longer periods of time than that possible by the use of the special ice containing hydrogen peroxide disclosed in my issued patent.

It has now been found that improved preserving action is secured in the preservation of foodstuffs of animal origin such as fish, meat or other perishable foodstuffs, if the foodstuff is first subjected to the action of an aqueous solution of hydrogen peroxide for a relatively short period of time. The aqueous solution of hydrogen peroxide should have a pH value falling within the range 3.0 to 5.0, and the foodstuff of animal origin may be immersed in the solution, sprayed with the aqueous solution of hydrogen peroxide, or otherwise contacted with the solution. The period of contact between the aqueous hydrogen peroxide solution and the foodstuff will depend, in general on the freshness of the material being treated. I prefer ordinarily to employ treatment periods of about ten minutes, although periods ranging from three minutes to thirty minutes have been employed at various times with complete success.

It has been found that the concentration of the aqueous solution of hydrogen peroxide utilized should preferably be 1.0% $H_2O_2$ or less. Ordinarily I prefer to use concentrations of hydrogen peroxide ranging from 0.1% to 0.5%. The pH of the aqueous solution of hydrogen peroxide may be adjusted within the range 3.0 to 5.0 by the addition of any acid or acidic material, although I have found that best results are secured when lactic acid is added to the aqueous solution of hydrogen peroxide in order to adjust its pH range within the value 3.0 to 5.0. Other addition agents, such as hydrochloric acid, sulfuric acid, acetic acid, phosphoric acid, and similar acids may also be employed for acidifying the aqueous solution of hydrogen peroxide but, as previously stated, lactic acid is utilized with special advantage, as by the presence of the lactic acid not only are the foodstuffs of animal origin preserved in the fresh state, but their quality is favorably influenced by the action of the lactic acid.

It is possible to employ a mixture of acids or acidic materials, if desired. Frequently the aqueous solution of hydrogen peroxide will also contain a buffering material, in order that the pH may be maintained within the desired range, and as buffer salts I may add the various buffering agents known to the art such, for example, as the alkali metal bisulfates, glycocoll, betain hydrochloride, the alkali metal phosphates, or similar salts or compounds.

In carrying out my improved process for the preservation of foodstuffs of animal origin such as meat, fish, etc., wherein the animal product, such as fish, may be readily preserved without special difficulty for periods of four days, five days, or even longer, the foodstuff is first contacted with the aqueous solution of hydrogen peroxide having a pH within the range 3.0 to 5.0, this solution being prepared as previously described. Although immersion is generally the easiest way in which the foodstuff may be contacted with the hydrogen peroxide solution, other methods of contact, such as spraying, may be adopted. Only a relatively short immersion period is necessary and, it is desirable following the immersion, to pack the fish in ice containing hydrogen peroxide. For most satisfactory results, therefore, I first immerse the foodstuff in the aqueous solution of hydrogen peroxide for the short period previously specified, and then pack the foodstuff in ice containing hydrogen peroxide. This treatment is found very valuable in the case of all foodstuff of animal origin, and is especially valuable for the preservation of fish. Fish so preserved were found to be extraordinarily fresh and of excellent flavor, even after relatively long periods of storage.

It should be understood that the details of my invention which have been previously given are to be regarded as illustrative and not restrictive except insofar as necessitated by the appended claims. Since various changes and variations may be made in the invention as described without departing from the true scope or spirit of that invention, its scope is to be determined from the appended claims and prior art.

I claim:

1. A process for preserving fresh unfrozen foodstuffs of animal origin which comprises subjecting said foodstuffs to the action of an aqueous solution of hydrogen peroxide having a pH within the range 3.0 to 5.0, and then packing said foodstuffs in ice containing hydrogen peroxide.

2. A process for perserving fresh unfrozen foodstuffs of animal origin which comprises subjecting said foodstuffs to the action of an aqueous solution of hydrogen peroxide having a pH within the range 3.0 to 5.0 for a period of time ranging up to thirty minutes, and then packing said foodstuffs in ice containing hydrogen peroxide, said ice containing hydrogen peroxide having a pH falling within the range 3.0 to 5.0.

3. A process for preserving fresh unfrozen foodstuffs of animal origin which comprises treating said foodstuffs with an aqueous solution of hydrogen peroxide containing lactic acid and having a pH falling within the range 3.0 to 5.0 for a period of time up to thirty minutes, and then packing said foodstuffs in ice containing hydrogen peroxide, said hydrogen peroxide ice having a pH of 3.0 to 5.0.

4. A process for preserving fresh unfrozen foodstuffs of animal origin which comprises treating said foodstuffs with an aqueous solution of hydrogen peroxide containing lactic acid and having a pH within the range 3.0 to 5.0 and then packing said foodstuffs in ice containing hydrogen peroxide, said hydrogen peroxide ice containing lactic acid and having a pH within the range 3.0 to 5.0.

5. A process for preserving fresh fish in the unfrozen condition which comprises contacting said fish with an aqueous solution of hydrogen peroxide having a pH falling within the range 3.0 to 5.0 and then storing said fish in contact with ice containing hydrogen peroxide.

RUDOLF THILENIUS.